Oct. 26, 1943.                H. W. CHAMPION                2,332,842
                                MUSICAL DEVICE
                            Filed Aug. 14, 1942          2 Sheets-Sheet 1
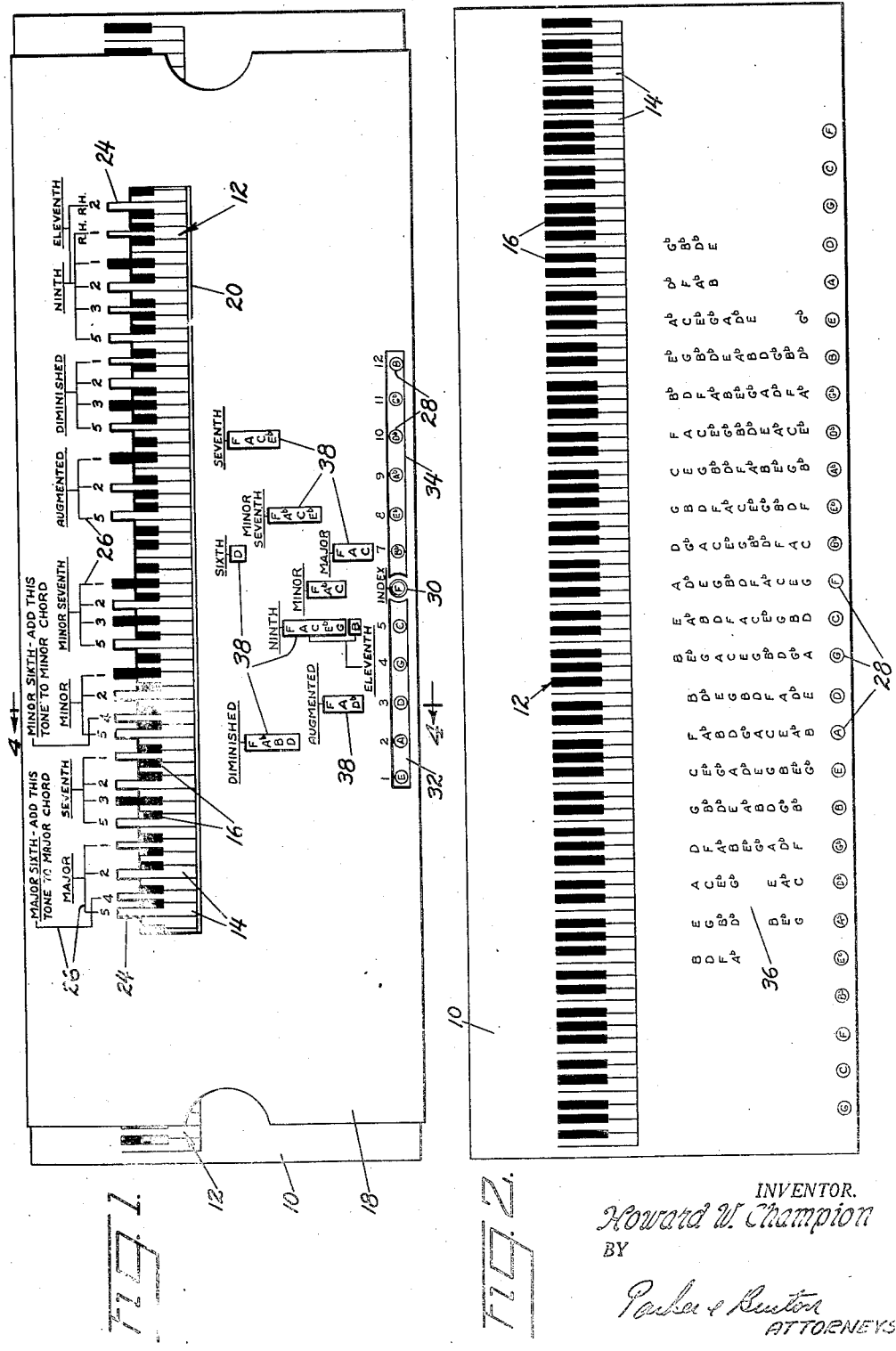
INVENTOR.
Howard W. Champion
BY
Parker & Burton
ATTORNEYS Oct. 26, 1943.     H. W. CHAMPION     2,332,842
MUSICAL DEVICE
Filed Aug. 14, 1942     2 Sheets-Sheet 2
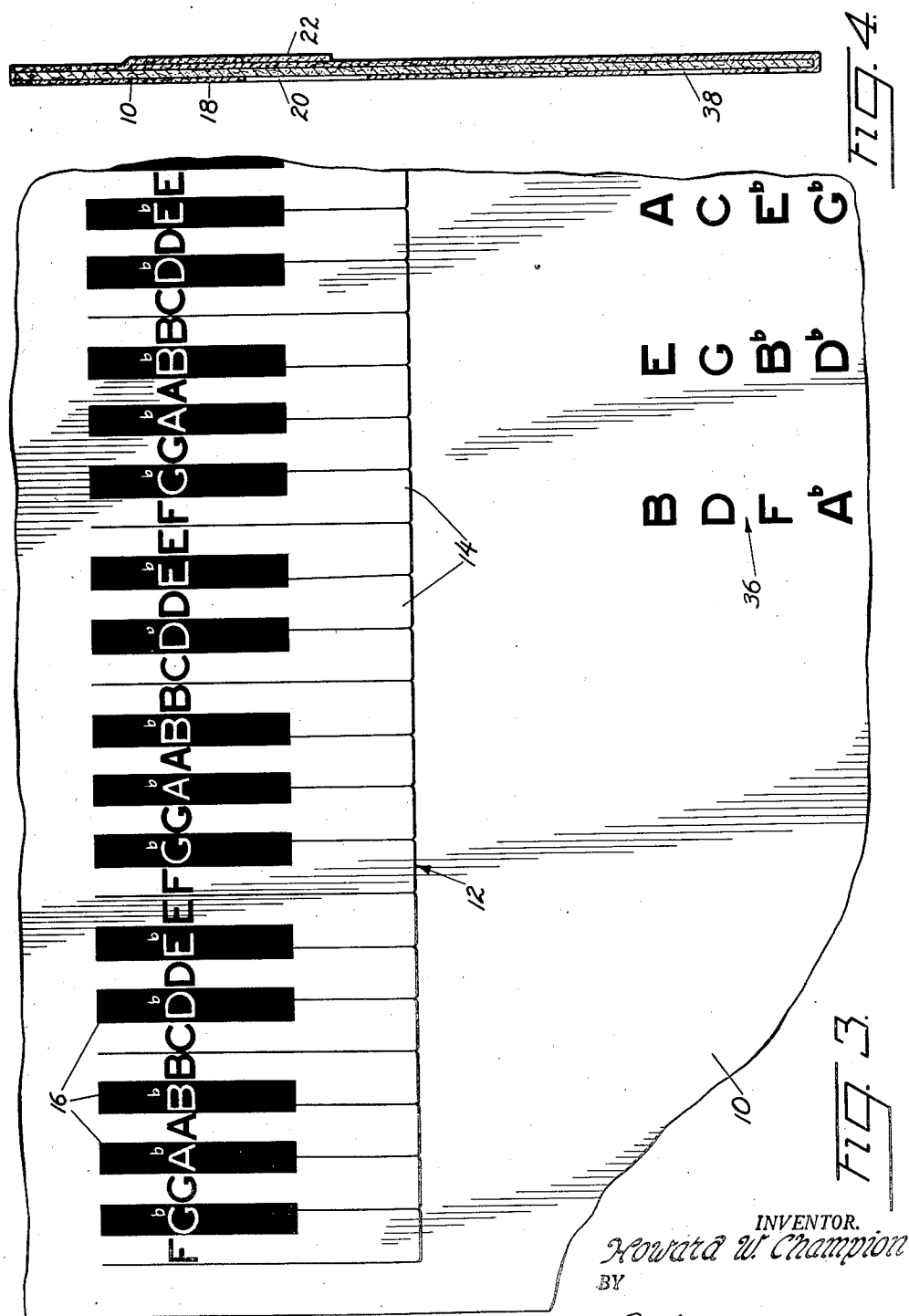

Patented Oct. 26, 1943

2,332,842

UNITED STATES PATENT OFFICE 2,332,842

MUSICAL DEVICE

Howard W. Champion, Detroit, Mich.

Application August 14, 1942, Serial No. 454,800

4 Claims. (Cl. 84—473)

This invention relates to music and particularly to a device for assisting in the instruction and arrangement of music.

An important object of this invention is to provide a novel method of converting musical symbols into chord harmony and a novel mechanical device for accomplishing this purpose. More specifically, it is an important object of this invention to provide for instructing beginning and advanced students of music in chord harmony and for assisting musicians in arranging musical scores. Another object of this invention is to provide a device of this character which easily and quickly explains the playing of chord harmonies and particularly the fingering necessary for accomplishing this end. A further object of this invention is to provide a musical instructing device in the form of a slide rule which realistically illustrates a method of playing various harmonious chord combinations for all musical keys.

An important novel feature of the invention is the incorporation in the slide rule device of a representation of a piano keyboard. Associated with the keyboard is the novel provision of means for clearly and quickly indicating the key names and the fingering for playing chord harmonies in any given key. Specifically, the device is composed of two members capable of movement relative to one another along a path of movement parallel to the longitudinal dimension of the keyboard. The keyboard is formed on one of the members and novel means is carried on the other member which according to the relative position assumed by the members clearly indicates on the piano keyboard representation various chord arrangements for a given musical key.

Another important feature of this invention is the structural relation of the parts or members composing the device. The piano keyboard on one of the members is displayed through a longitudinal slot in the other member. Novel means is provided on the latter for clearly and distinctly indicating not only the key names of certain chord harmonies but also the fingering for playing the same. Another novel feature is the provision of means for quickly indicating the musical key of the chords pointed out on the keyboard. A further novel feature is the incorporation in the device of means for indicating the tone names of the chords at a point separate from the keyboard in order to facilitate instruction in music.

Various other objects, advantages and meritorious features will become more fully apparent from the following specification, appended claims and accompanying drawings, wherein:

Fig. 1 is a front elevation of the device showing one position of the parts or members in its operation, Fig. 2 is a plan view of one of the members of the device containing the keyboard representation, Fig. 3 is an enlarged detail view of a part of the member shown in Fig. 2, and Fig. 4 is a cross-sectional view of the device along line 4—4 of Fig. 1.

The device in general is in the form of a slide rule. It is composed of at least two elongated members arranged in parallel planes and assembled for sliding movement relative to one another. One member 10 carries a piano keyboard representation generally indicated at 12 and including the usual white keys 14 and the black keys 16. The other member 18 superimposes member 10 and is provided with a longitudinal slot 20 through which the keyboard 12 is displayed. Members 10 and 18 are assembled together so that they are movable relative to one another in a straight line paralleling the longitudinal dimension of the keyboard. An alternate arrangement is to form the keyboard 12 and slot 20 in an arc and pivotally connect the two members 10 and 18 at the center of the arc for swinging sliding movement relative to one another. It is understood that such a modification falls within the scope of the invention.

In the illustrated embodiment of the invention, the member 10 is formed of a relatively thick material such as thick paper, cardboard, or a plastic sheet. Member 18 is of relatively thin flexible sheet material capable of being folded around member 10 and secured to itself in overlapping relation as shown at 22 in Fig. 4. This will form a flat tube in which member 10 is slidable from one end to the other. The outside member 18 may be of different material such as cardboard or plastic and slidably interlocked with member 10 for the desired relative movement. Preferably, although not necessarily, the inside member 10 is made longer than member 18 in order that it may project slightly from either end to facilitate movement thereof.

As hereinabove mentioned, an important feature of the invention is the provision of novel means for indicating a plurality of chord harmonies for all the musical keys. Specifically, this novel means graphically informs the user the fingering needed for playing on a piano keyboard or other musical instrument a plurality of chord harmonies. The chords indicated in the present embodiment of the invention are those commonly used in music. More may be shown, if desired. The indicial means for pointing out the chords in the present embodiment is formed on the margin of the slot 20 on the side of the black keys 16. Preferably, member 18 is constructed so that one margin of the slot 20 overlaps upon the black key side of the keyboard. Indentations 24 are provided in this overlapping marginal portion which expose greater sections of certain of the keys in the keyboard. As will be more fully explained hereinafter, these indentations are arranged in such a relation to the keyboard that they indicate the fingering for playing a plurality of chords in any given key.

Each key of the keyboard 12 is given a musical key name and arranged in the same repetitive sequence as on a standard piano keyboard. These key names are preferably formed or printed directly on the keys themselves as indicated in the enlarged sectional view in Fig. 3. Only flat names are shown on the keys but their alternate sharp names may be shown, or both together. For purposes of clarity, these name designations are omitted from the smaller scale views of the keyboard in Figs. 1 and 2.

It will be noted that the names of the keys on the keyboard are placed thereon at a relatively high level. That is to say, they are located in the region of the black keys and closer to the rear ends of the keys than toward the front. The purpose of this arrangement is to dispose the key names under the overlapping margin of the slot 20 except those which are exposed to view through the indentations 24. The indentations are arranged in such a way as to display harmonious chords on the keyboard representation.

Appearing above the keyboard on the outside member 18 are the names of various chords. A representation of how these may appear is shown in Fig. 1. Preferably only the chords commonly used are shown but others may be added if desired. For clarity, the chord names are arranged in a row above the keyboard. Certain of the chords names may overlap upon the other, such as the major and major sixth, and minor and minor sixth, which require the addition of only one key respectively to be played. Extending from these chord names are lead lines 26 terminating in alignment with certain selected indentations 24. Between the ending of each lead line 26 and the indentation which it is intended to designate is a space in which a number from 1 to 5 may be printed. This numbering refers to the fingers of the hand playing the chord. The numbering 1 to 5 designates the fingers of the left hand for playing the given chord. Thus the marking on the keyboard 12 and the outside member 18 indicate not only the key names of chords but also a fingering for playing the chords on a piano keyboard.

A novel provision is made for indicating the musical key in which the chords are played. This consists in providing on the inside member 10 a row or series 28 of the various musical key names and an opening or index window 30 in the outside member 18 in which these key names are successively exposed. Each key name as it appears in the window 30 designates the key in which all the chords as indicated above the keyboard are played. On opposite sides of the index window 30 are narrow slots 32 and 34 which expose the remaining eleven keys of the series.

This is in order to inform the user the direction he should shift member 10 to bring the desired key within the window 30, and also to be used as a means of transposition as will be pointed out hereinafter.

In order to insure perfect alignment of the two members, it is preferred to form or print a circle around each key name in the row 28. The opening or index window 30 is in the form of a circle of a slightly greater diameter than the printed circles around each key name. Thus when the circle around the desired key is completely exposed through the window 30, the two members 10 and 18 are in perfect alignment for indicating the chord harmonies on the keyboard.

In order to facilitate instruction, it is desirable to list the tone names of the keys in each chord harmony separate from the keyboard. Between the keyboard and the row of key names 28, which is located along the bottom of the instrument, is a tone name scale generally indicated at 36. This scale consists of a series of lines of musical keys arranged in equally spaced apart relationship. Openings or windows 38 are provided on the outside member 18 which expose a small portion of the entire name scale at each operating position to which the members are shifted. The tone names on the scale are selected in such an order and so arranged that only the key names of the desired chord are shown through the windows 38. As shown in Fig. 1, the key names exposed through the windows are in vertical alignment. Printed on the outside face of the member 18 adjacent to each window 38 is the name of chord displayed through the window.

The tone name scale 36 bears a definite relation to the keyboard. It is laid out so that the space interval between the keys on the keyboard and the space interval horizontally between the tone names on the scale therebelow are proportional to one another. This has been accomplished by making rows of tone names and selecting an order such that all the tone names of an octave appear one after the other without repetition until all have been used. This order bears such a relation to the keyboard that there is an economy in the size of the tone name scale and the movement of the parts. It enables equal increments of movement of the inside sliding member 10 to expose successive chord harmonies in order. At any specific setting of the device, all the chords of the key indicated at window 30 appear at one time and no superfluous chords or tone names are displayed. The arrangement conserves in space and time and there is no superfluous matter exposed to view at any time.

In the embodiment of the invention illustrated herein, the order selected for the tone name scale 36 bears a definite musical and linear relation to the keyboard 12. A certain preselected sequence of the tone names is used. In this sequence, all the tone names of an octave appear one after the other without repetition until all have been used, and this sequence is repeated over and over in the rows making up the name scale. The name scale in the illustrated embodiment of the invention is laid out in linear fifths from left to right. That is to say, the distance separating the tone names "C" and "F" in the scale 36 correspond to the distance measured by five keys on the keyboard. The horizontal spacing of the tone names in the scale 36 may therefore be considered linearly in increments of five. However, musically, the separation of the tone names in the scale 36 is arranged horizontally in perfect fourths from left to right and in perfect fifths from right to left. Other arrangements might be used but the one selected appears to obtain the greatest economy in the use of musical symbols and the movement of the parts of the device.

It should be understood that the piano keyboard 12 is merely a representation in linear form of the tone intervals. It is preferred for instruction in music and particularly for the piano. However, other tone interval scales might be used, such as would be helpful in teaching students to play other musical instruments, and in its broader aspects it is understood the invention covers these adaptations.

The device is very readily capable of indicating key to key and chord to chord transposition. For key to key transposition, the slide rule is set at the key the particular music piece in question is written in. That is to say, the member 10 is shifted until the key of the piece is exposed through the window 30. Referring now to the horizontal row of numbers immediately above the slot 32, take the number above each tone on the slide rule and write it above each corresponding tone in the piece. Shift the member 10 to expose the desired key in the index window 30, and note the tone now appearing under the numbers along the upper margin of slot 32 and write these new tones on the piece alongside of the number previously written on the piece. For chord to chord transposition, the same process is used except the chord name is noted with the number and played when new desired key is obtained in index.

What I claim is:

1. A device of the character described comprising, in combination, a pair of flat sheet-like members disposed together in parallel planes, means providing slidable movement of one member relative to the other along a predetermined path of movement, one of said members provided with a piano keyboard representation having its longitudinal dimension extending in line with said path of movement, the other member provided with an elongated slot over said keyboard representation exposing a substantial portion thereof to view, one side margin of said window partially overlapping upon the keyboard and provided at spaced intervals with indentations displaying greater portions of certain keys on said keyboard than the remaining keys on the keyboard, said indentations arranged so as to indicate the chords of a given key, and means separate from said keyboard for indicating the key name for the chord harmony indicated by said indentations.

2. A musical slide rule for assisting in the teaching of music comprising, in combination, a pair of members superimposing one another and being movable in their respective planes relative to one another, one of said members having a musical tone name scale on one portion thereof and a representation of a piano keyboard on another portion thereof, the other of said members having a plurality of openings over the portion carrying the tone name scale of said first described member exposing certain of said tone names to view as one member is moved relative to the other, said second member further provided with an elongated slot over the portion carrying the piano keyboard representation on said first described member exposing the piano keyboard to view, one marginal edge of said slot provided with relatively small indentations extending perpendicularly to the longitudinal dimension of the slot and bearing a definite relation to said openings and the tone names exposed therethrough.

3. A device of the character described comprising, in combination, a pair of flat sheet-like members superimposing one another and slidable relative to one another in their respective planes along given paths of movement, one of said members having a portion of its surface covered with names of musical tones arranged in parallel rows extending in the direction of the relative slidable movement of the members and another portion provided with a piano keyboard representation having its longitudinal dimension likewise extending in the direction of slidable movement of the members, the remaining member provided with a plurality of openings therethrough over the portion of the first described member covered with said rows of tone names and upon movement of said members exposing successive tone names therethrough, said last described member further provided with an elongated opening over said portion of the first described member provided with said keyboard representation exposing to view a substantial part thereof, one of the side margins of said elongated opening overlapping upon the ends of the keys of the keyboard but provided with indentations at spaced intervals exposing greater portions of certain of said keys at any position in the relative path of movement of the two members.

4. A device for assisting in the teaching of music comprising, in combination, a pair of members superimposing one another and so associated together that one is movable relative to the other, one of said members having on one portion thereof indicial marks representing the names of musical tones and on another portion thereof a representation of a piano keyboard, the remaining member provided with a plurality of windows over said portion of the first described member having the names of the musical tones and successively exposing certain of the tone names to view as one member is moved relative to the other, said second described member further provided with an elongated window therein over said portion of the first described member having the piano keyboard representation and exposing the latter to view therethrough, one longitudinal margin of said elongated window being formed so as to block out parts of certain of the keys of said keyboard representation while more fully exposing other keys in a definite relation to the tone names exposed to view.

HOWARD W. CHAMPION.